United States Patent [19]

Louet et al.

[11] Patent Number: 4,507,631

[45] Date of Patent: Mar. 26, 1985

[54] DEVICE COMPRISING A CAVITY AND A LINEAR RESONATOR FIXED WITHIN SAID CAVITY, AND A METHOD OF ASSEMBLY OF SAID DEVICE

[75] Inventors: Daniel Louet; Gilbert Darnois, both of Paris, France

[73] Assignee: Thomson-CSF, Paris, France

[21] Appl. No.: 452,132

[22] Filed: Dec. 22, 1982

[30] Foreign Application Priority Data

Dec. 23, 1981 [FR] France ............................ 81 24158

[51] Int. Cl.³ ..................... H01P 11/00; H01P 7/04; H01P 7/06
[52] U.S. Cl. ................................. 333/222; 333/206; 333/227; 333/245; 29/600
[58] Field of Search .................... 333/206–207, 333/222–226, 244, 245, 248, 252, 227; 29/600; 174/28; 425/383–385, 387.1

[56] References Cited

U.S. PATENT DOCUMENTS

| 2,437,482 | 3/1948 | Salisbury | 333/244 |
| 2,510,358 | 6/1950 | Wolf | 178/24 X |
| 2,752,577 | 6/1956 | Polk | 333/244 |
| 3,718,865 | 2/1973 | Wierts et al. | 313/62 |

FOREIGN PATENT DOCUMENTS

| 883928 | 7/1953 | Fed. Rep. of Germany . |
| 1958877 | 9/1970 | Fed. Rep. of Germany . |
| 559743 | 3/1944 | United Kingdom . |
| 716101 | 9/1954 | United Kingdom . |
| 1209213 | 10/1970 | United Kingdom . |

OTHER PUBLICATIONS

Electronic Engineering, vol. 41, No. 494, Apr. 1969, P. Bramham; "Matched Vacuum Window for Coaxial Line", pp. 491–496.

Primary Examiner—Marvin L. Nussbaum
Attorney, Agent, or Firm—Oblon, Fisher, Spivak, McClelland & Maier

[57] ABSTRACT

The device comprises a cavity, a resonator placed within the cavity and a support plate for fixing the position of the resonator within the cavity. Recesses are formed in the cavity and the resonator at the point at which they are in contact with the support plate. The support plate is of thermocompressible material. The cavity comprises at least two parts and one of these parts is in contact with the support plate; in order to mount the resonator within the cavity this latter part is assembled with the support plate, the resonator, mechanical locking members and a piston so that the support plate is thus completely surrounded. The assembly is heated to the temperature chosen for thermocompression, whereupon the support plate is compressed by means of the piston. The thermocompressible material then fills the recesses and ensures rigid positioning of the resonator after cooling.

5 Claims, 5 Drawing Figures

DEVICE COMPRISING A CAVITY AND A LINEAR RESONATOR FIXED WITHIN SAID CAVITY, AND A METHOD OF ASSEMBLY OF SAID DEVICE

This invention relates to microwave devices in which provision is made for a cavity, a linear resonator and a support for fixing the resonator within the cavity, said support being constituted by a plate having a dielectric constant below 2.6 in contact with the internal wall of the cavity and pierced by a hole which surrounds part of the resonator.

As is already known, devices of this type are employed, for example, in the construction of oscillators. In known designs, the support is usually of polytetrafluoroethylene, also known by the trademark Teflon. Said support is machined with high precision in order to ensure that the resonator is positioned within the cavity as accurately as possible. Since bonding of polytetrafluoroethylene by adhesion is very difficult in practice, the support is held in position in most cases by clamping between two sides of the cavity and the resonator is forcibly inserted in the hole of the support. However, positioning of the support and of the resonator as thus described cannot readily be performed with accuracy and does not ensure good mechanical strength of the device when this latter is subjected to stresses such as high accelerations or vibrations.

The object of the present invention is to circumvent these disadvantages by proposing a device in which the support is fixed within the cavity and the resonator is fixed within the support by thermocompression of said support.

According to the present invention, there is provided a device comprising a cavity having an internal wall, and within said cavity a linear resonator of given length and a support for maintaining said resonator in position within said cavity, said support being formed by a plate of plastic material which has been subjected to thermocompression, said support being in contact with the internal wall of the cavity and being pierced by a hole in which a portion of the resonator is introduced, wherein m (where m is a whole number at least equal to 1) recesses for securing the support are formed in the cavity wall which is in contact with said support, wherein n (where n is a whole number at least equal to 1) recesses for securing said support are formed in that portion of the resonator which is introduced within the hole, and wherein said recesses are filled with the support material as a result of thermocompression of said support.

Other features of the invention will be more apparent upon consideration of the following description and accompanying drawings, wherein.

In the different figures, corresponding elements are designated by the same references.

Figure 1:
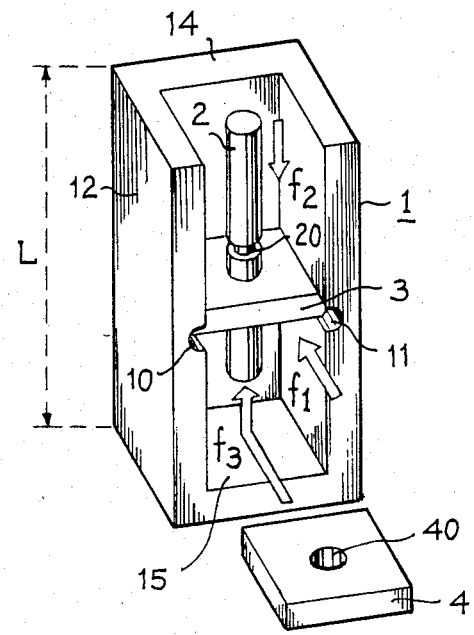
FIGS. 1, 2 and 3 are schematic views in perspective showing the different stages of one example of assembly which permits the construction of a device in accordance with the invention.

FIG. 1 is a schematic view showing part of a cavity 1, a linear resonator 2 of cylindrical shape which is intended to be mounted within the cavity, and a support plate 3 of thermocompressible plastic material which is intended to permit assembly of the resonator 2 within the cavity 1.

That portion of the cavity 1 which is illustrated in FIG. 1 is a one-piece unit formed by four sides of an elongated rectangular parallelepiped, namely a bottom portion 14 having a length L, two parallel sides 12, 13 having the same lengths as the bottom portion and an end plate 15. The cavity is also provided with another end plate and with a cover which are not shown in FIG. 1 but are screwed on the one-piece unit at the last moment at the time of assembly of the oscillator which is intended to incorporate said cavity, that is, at the moment when the resonator 2 has finally been securely fixed within the one-piece unit together with the other different components (not shown in the drawings) such as the output transistor, the base of which is connected to that end of the resonator 2 which is located nearest the end plate 15.

A groove 10, 11 is cut in each side wall 12, 13, said groove being perpendicular to the bottom wall 14 of the one-piece unit of the cavity. These grooves are placed in oppositely-facing relation. The support plate 3 is inserted by sliding within the cavity (in the direction of the arrow $f_1$) in a plane which is parallel to the end plate 15 and passes through the grooves 10 and 11. The support plate penetrates practically to the bottom of said grooves. The plate 3 is pierced by a hole in which the resonator 2 is inserted (as indicated by the arrow $f_2$). Provision is made substantially at the center of the resonator 2 for a groove 20 in the shape of a circular channel and concealed in the hole of the plate 3 in the position which the resonator is intended to occupy within the cavity.

When the support plate 3 and the resonator 2 are placed within the cavity, a flat spacer member 4 pierced by a hole 40 is introduced at the bottom of the cavity between the end plate 15 and the resonator 2. To this end, said spacer member has a contour in the shape of a rectangular parallelepiped and its edge faces are respectively in contact with the side walls 12 and 13 and with the bottom wall 14 whilst the fourth edge face is located in the same plane as the end faces of the side walls 12, 13, namely the end faces which are remote from the bottom wall 14. When said spacer member is in position at the bottom of the cavity, it is displaced in translational motion until it comes into contact with the support plate 3. The hole 40 has dimensions and a position which are studied so as to ensure that, during the aforementioned movement of translational displacement, the edges of said hole are in sliding contact around the resonator 2, said resonator being placed at a distance which is to be subsequently maintained with respect to the side walls 12, 13 and with respect to the bottom wall 14. Introduction of the spacer member within the cavity followed by translational displacement towards the support plate 3 are represented schematically by an arrow $f_3$ in FIG. 1.

Figure 2:
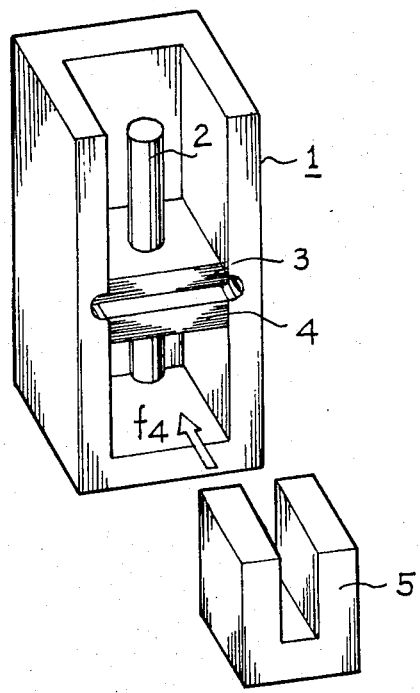

FIG. 2 shows the cavity 1 after the support plate 3, the resonator 2 and the spacer member 4 have been introduced as indicated with reference to FIG. 1. FIG. 2 also shows a U-shaped spacer member 5 which is so dimensioned that the height added to the thickness of the spacer member 4 is equal to the distance at which the support plate 3 must be located with respect to the end wall 15 in the device to be constructed. Said spacer member 5 is inserted within the cavity between the spacer member 4 and the end plate 15 in a position such that the two vertical arms of the U pass on each side of the resonator 2 (as indicated by the arrow $f_4$).

Figure 3:
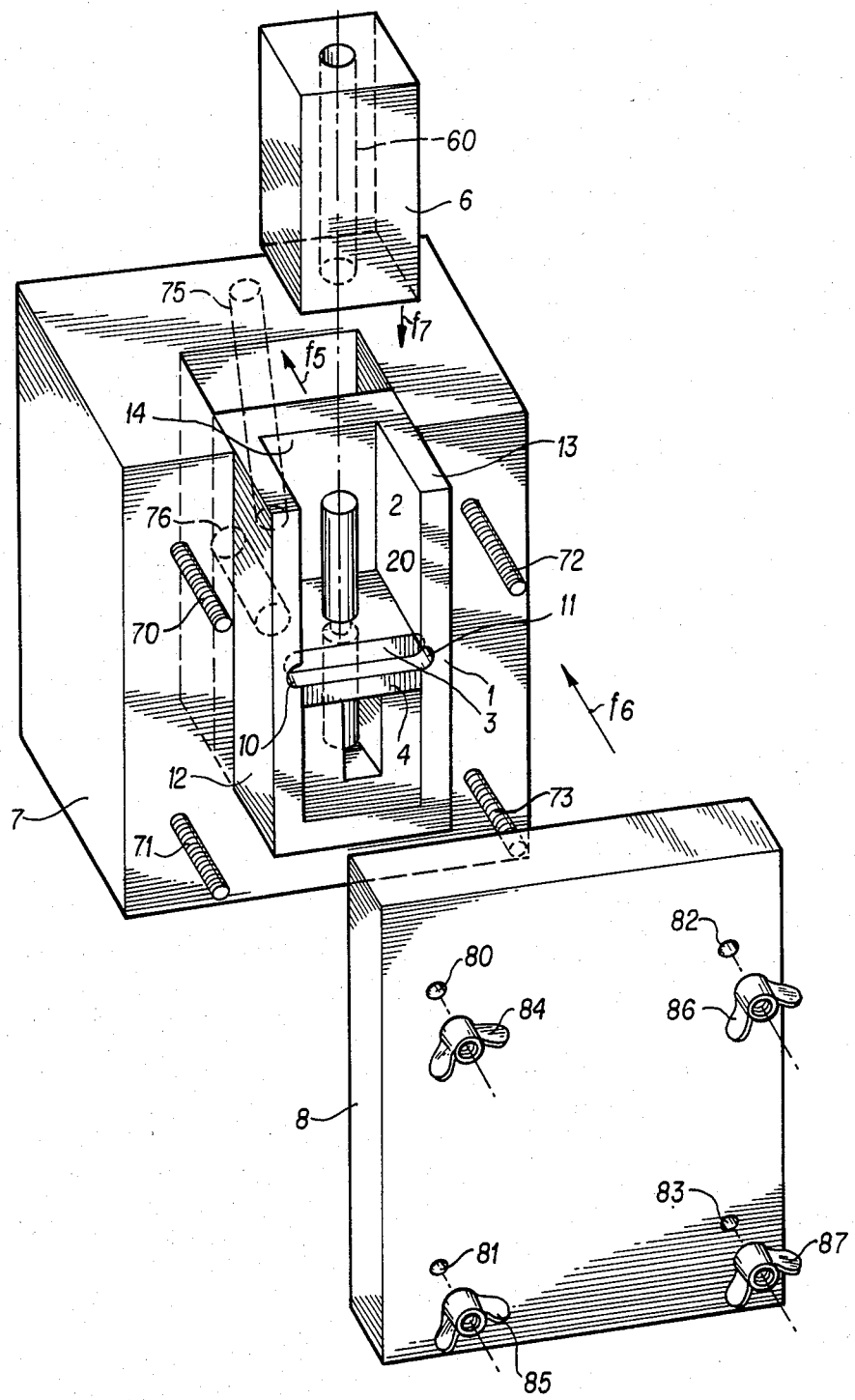

In FIG. 3, the parts 1 to 5 are in the position occupied after completion of the positioning operation described with reference to FIGS. 1 and 2. As shown by the arrow $f_5$, this assembly is inserted within a housing formed in a block 7 fitted with four threaded rods 70 to 73. A cover 8 pierced by four holes 80 to 83 through which threaded rods 70 to 73 respectively are intended to be passed is brought into contact with the block 7 (as shown by the arrow $f_6$) and is locked in this position by means of four nuts 84 to 87 which are screwed respectively on the four rods 70 to 73. The block 7 and the cover 8 thus form an enclosure with a single opening and the internal wall of said enclosure is machined so as to be in close contact with the outer wall of the bottom portion 14, of the parallel side walls 12 and 13, of the end plate 15, and so as to be in close contact with the edge faces of the spacer member 4 and of the side walls 12 and 13 at the end remote from the bottom portion 14.

As shown in FIG. 3 and represented by the arrow $f_7$, a piston 6 is introduced into the enclosure 7-8. Said piston is so designed as to fill the free space of the cavity 1 located above the support plate 3 and is provided for this purpose with a bore 60 in order to be capable of displacement in sliding motion between the cavity and the cover 8 when this latter is secured to the block 7. The height of the piston 6 is calculated so that it projects beyond the opening of the enclosure 7-8 when said piston reaches a position in which it bears on the support plate 3.

It is worthy of note that the block 3 is provided with two bores 75 and 76 and that each bore extends from the rear face of the block to the housing in which the cavity 1 is placed. The bore 75 which has its opening at the level of the support plate 3 is a smooth bore for the measurement of temperature in the vicinity of said plate. The bore 76 is provided with a screw-thread for receiving a screw which will be employed as an extractor in order to facilitate extraction of the cavity 1 from the block 7 after completion of the thermocompression operation which will be described with reference to FIGS. 4 and 5.

Figure 4:
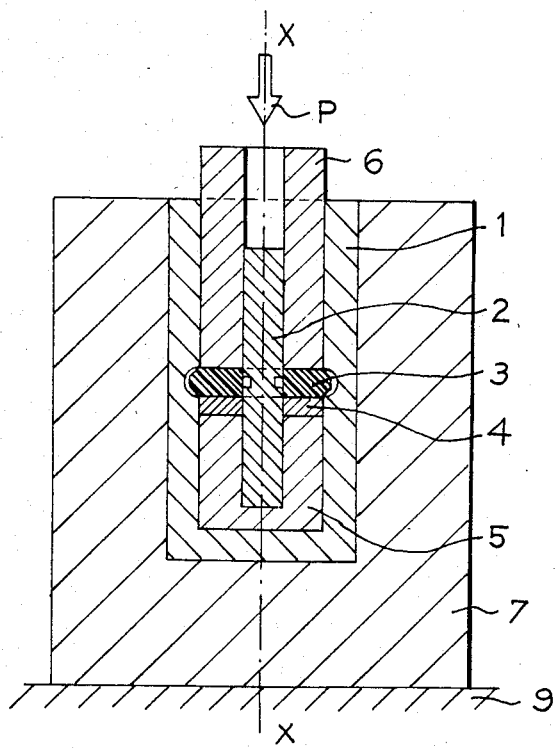
FIG. 4 is a schematic sectional view illustrating part of a treatment process for obtaining a device in accordance with the invention.

FIG. 4 is a sectional view showing the parts 1 to 7 which have been fitted together so as to form the assembly described with reference to the preceding figures. The plane of section is the plane parallel to the bottom portion 14 (as shown in FIG. 1) of the cavity 1 and passes through the major axis X—X of the resonator 2.

As shown in FIG. 4, the parts 1 to 7 are placed on a hot-plate 9, only the top portion of which is shown in the figure. Said hot-plate serves to heat the support plate 3 to a predetermined temperature T which is measured by means of a thermometer placed within the bore 75 of the block 7 (as shown in FIG. 3). The temperature T aforesaid is determined experimentally so as to ensure good thermocompression of the support plate 3, taking into account the material which constitutes said plate and its volume. When said temperature T is attained, it is maintained for a period of time which varies as a function of the composition and volume of the support plate 3. Said plate is compressed by means of a press which is equipped with a pressure gage and produces downward displacement of the piston 6. Said press is represented schematically in the figure by an arrow P.

Under the action of heat, the thermocompressible material constituting the support plate 3 becomes soft, the pressure to which it is then subjected produces a reduction in thickness by compression and lateral spreading, thus filling the grooves cut in the wall of the cavity 1 and of the resonator 2.

When a predetermined value obtained after different tests on other identical cavity-resonator-support assemblies is attained in respect of the pressure P, the action of the press is discontinued and the enclosure 7-8 is opened (as shown in FIG. 3). The support plate 3 is then subjected to rapid cooling which, in the case of the example herein described, is produced by a cold-air blower. The spacer members 4 and 5 are then removed together with the piston 6.

Figure 5:
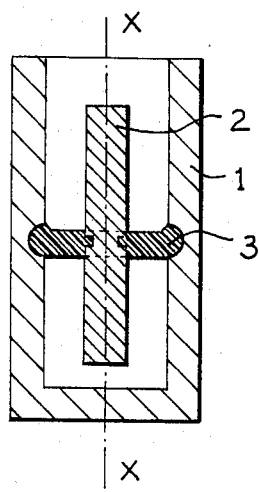
FIG. 5 is a partial view of a device in accordance with the invention after completion of the treatment process.

In a cross-sectional view which is taken along a plane parallel to the bottom portion 14 (as shown in FIG. 1) and passes through the major axis X—X of the resonator, FIG. 5 shows how the support plate 3 is positioned with respect to the cavity 1 and with respect to the resonator 2. Thus the grooves formed in the cavity are completely filled and the support plate, which has been restored to its initial hardness after cooling, provides a rigid coupling between the cavity and the resonator. Accuracy of positioning of the resonator within the cavity is essentially determined by precision of manufacture of the spacer members 4 and 5. Accuracy of positioning to within one-tenth of a millimeter has been achieved by machining of the parts 1, 2, 4 and 5 to a tolerance of one-twentieth of a millimeter in the form of construction which has served as an example in the description and the main characteristics of which are indicated below.

Inasmuch as FIGS. 1 to 5 have been drawn in compliance with the ratios between the dimensions of the different elements, it is only necessary to indicate that the length of the resonator 2 was 4 centimeters.

In the embodiment described, the material chosen for the support plate 3 is a polystyrene copolymer marketed under the trade name Polypenco and designated by the reference Q 2000.5. This is a rigid and transparent product having a dielectric constant of 2.52. The support thus formed was heated to 140° C., maintained at this temperature on the hot-plate for a period of six minutes, then compressed under a pressure of the order of $6 \times 10^7$ pascals. The temperature of the support was then rapidly reduced to 60° C. Tests performed on cavities fabricated from said product in the manner described in the foregoing have served to demonstrate that this support of thermocompressed polystyrene copolymer

- could be employed up to 10 GHz without any particular problem;
- can be stored at temperatures within the range of −40° C. to +80° C. without any difficulty;
- is capable without any resultant damage of withstanding accelerations of 10 g and vibrations having a constant amplitude of 0.2 mm at frequencies ranging from 5 to 100 Hz.

Thus, in regard to mechanical characteristics, the example of construction described in the foregoing is mainly distinguished from conventional designs of the type comprising a support of polytetrafluoroethylene by the following features:

- accuracy of positioning which is not a function of accuracy of construction, positioning and fixing of the support;
- resistance to mechanical stresses which is considerably higher than that of polytetrafluoroethylene.

The present invention is not limited to the example hereinabove described. Accordingly, other thermocompressible plastic materials can be employed insofar as their characteristics are compatible with those sought in the case of the device comprising a cavity in which a resonator is intended to be fixed. The first of these characteristics will usually be a dielectric constant which is as low as possible, a value lower than 2.6 being considered satisfactory in the majority of instances.

Similarly, the grooves formed in the internal wall of the cavity and in the resonator could be replaced by recesses of smaller dimensions and could consist of simple holes in an extreme case. It remains apparent, however, that said recesses will be so arranged as to be filled with the material constituting the support on completion of the thermocompression operation.

What is claimed is:

1. A device comprising a cavity having an internal wall, and within said cavity a linear resonator of given length and a support for maintaining said resonator in position within said cavity, said support being formed by a plate of plastic material which has been subjected to thermocompression, said support being in contact with the internal wall of the cavity and being pierced by a hole in which a portion of the resonator is introduced, wherein m (m being a whole number at least equal to 1) recesses for securing the support are formed in the cavity wall which is in contact with said support, wherein n (n being a whole number at least equal to 1) recesses for securing said support are formed in that portion of the resonator which is introduced within the hole and wherein said recesses are filled with the support material as a result of thermocompression of said support.

2. A device according to claim 1, wherein the internal wall of the cavity has two opposite faces, wherein m is at least equal to 2, and wherein two of the m recesses are in parallel relation and formed respectively in the two opposite faces.

3. A method of assembly of the device according to claim 1 and applicable to a cavity having a hollow portion to be rigidly fixed to a support formed by a plate which has two sides and wherein a mechanical assembly is employed for delimiting with said hollow portion and the resonator an internal space which contains said support, said assembly being constituted by at least one spacer member and a piston to be mounted on each side of the support, wherein said plate is heated to a temperature T and then compressed at said temperature under a pressure P produced by said piston, and wherein the mechanical assembly is then removed.

4. A method according to claim 3, wherein the support is a polystyrene copolymer of the type which is marketed under the trade name Polypenco and designated by the reference Q 2000.5, wherein the temperature T is equal to approximately 140° C., wherein the pressure P is of the order of $6 \times 10^7$ pascals, and wherein said support is restored to approximately 60° C. by forced cooling immediately after it has been compressed.

5. A method according to claim 3, wherein the hollow portion employed has predetermined external contours and wherein said method consists in employing a mechanical assembly which is also provided with an enclosure, said enclosure being adapted to conform substantially to the external contours of the hollow portion in order to form a clamp and prevent deformation of said hollow portion while the support is being compressed.

* * * * *